United States Patent Office 3,362,976
Patented Jan. 9, 1968

3,362,976
METHOD FOR MAKING ORGANOSILICON
HYDRIDES
Abe Berger, Schenectady, N.Y., assignor to General Electric Company, a corporation of New York
No Drawing. Filed Dec. 23, 1963, Ser. No. 332,860
7 Claims. (Cl. 260—448.2)

ABSTRACT OF THE DISCLOSURE

Partial reduction of diphenyldichlorosilane to diphenylchlorosilane is achieved by adding diphenyldichlorosilane to a mixture of an alkali borohydride, such as sodium borohydride, and a nitrile solvent, such as acetonitrile, or an ester solvent such as ethylacetate. If desired, the alkali borohydride can be generated in situ by the use of an alkali hydride, such as sodium hydride, and a small amount of an alkali borohydride.

---

The present invention relates to a method for partially reducing diorganohalosilane. More particularly, the present invention relates to the reaction of certain alkali borohydride and diorganodihalosilane and the production of diorganohalosilane.

It is generally known that diorganohalosilanes having the formula, (1) $\qquad R_2Si(H)X$ where R can be the same or different radical selected from a monovalent hydrocarbon radical and halogenated monovalent hydrocarbon radical, and X is a halogen radical, are quite valuable for introducing $R_2Si(H)O_{.5}$ units into a variety of organopolysiloxane compositions. These compositions can be further modified through catalyzed addition reactions to provide for the production of valuable copolymers. Presently, known methods for making diorganohalosilane of Formula 1, are limited to direct reaction of silicon with organic chloride, as shown in Rochow Patent 2,380,995, the use of organometallic reagents with halogenated silicon hydrides, or catalyzed interchange between silicon halide and silicon hydride. Although these methods can provide for advantageous results in particular situations, those skilled in the art know that in many instances these methods are often undesirable. It is well known, for example, that organometallics, such as Grignard reagents, organolithium compounds, etc. require special preparation, are highly unstable, and are restricted to materials which are free of polar radicals, such as nitro, ester, nitriles, etc. radicals. Redistribution reactions also are often undesirable; it is difficult for example, to favor the formation of a particular product without the production of a variety of other products. In addition, aryl silicon bonds often cleave readily in the presence of redistribution catalyst. The direct reaction of silicon and organic chloride by the method of Rochow moreover, is only advantageous in instances where both R's of Formula 1 are the same. It would be desirable therefore, to provide for the direct production at high yields of diorganohalosilanes of Formula 1 in an easy and desirable manner, by the use of readily available starting materials.

The present invention is based on the discovery that diorganohalosilanes shown by Formula 1, can be made by partially reducing readily available diorganodihalosilanes having the formula (2) $\qquad R_2SiX_2$ where R is defined above, and X can be chloro, bromo, iodo, or fluoro. Partial reduction of diorganodihalosilane of Formula 2 can be effected by employing an ester, a nitrile, or mixture thereof, with an alkali borohydride such as sodium borohydride, or potassium borohydride. The term "alkali borohydride" as utilized in the present invention, designates the chemical compound $MBH_4$, where M is either sodium or potassium. In addition, $MBH_4$, also designates the regeneration of this compound, in situ, from a mixture having a major amount of a metal hydride, such as YH, with an ester, nitrile, or mixture thereof, and a minor amount of $MBH_4$, where Y is selected from sodium, potassium, rubidium and cesium.

In accordance with the present invention, there is provided a method for making diorganohalosilane of Formula 1 which comprises (1) reacting a diorganodihalosilane of Formula 2 with $MBH_4$ in the presence of a member selected from an ester, a nitrile, or mixture thereof, where there is utilized per mole of said diorganodihalosilane, from about 0.5 to about 2 moles of $MBH_4$ reactant selected from (a) $MBH_4$ and (b) a mixture of from about 0.5 to 2 moles of YH, and from about 0.5% to 5% by weight of said diorganodihalosilane of $MBH_4$, (2) effecting the separation of borohydride residue from the product of the reaction of (1), and (3) recovering diorganohalosilane from the resulting mixture of (2), where M, X and Y are defined above.

Radicals included by R of Formulae 1 and 2 are for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., phenylethyl, benzyl, etc. radicals, alkenyl radicals, e.g., vinyl, allyl, etc. radicals; alkynyl radicals, e.g., ethynyl, propargyl, etc. radicals; cycloalkyl radicals, e.g., cyclohexyl, cycloheptyl, etc. radicals; cycloalkenyl radicals; e.g., cycloheptenyl, cyclohexenyl radicals, etc., and haloalkyl or haloaryl radicals as p-chlorophenyl, m-bromophenyl, chloropropyl, etc. radicals.

Included by the diorganodihalosilane of Formula 2 are for example, dimethyldichlorosilane, methylethyldichlorosilane, diethyldichlorosilane, methylvinyldichlorosilane, di-n-propyldichlorosilane, methylphenyldichlorosilane, diphenyldichlorosilane, p-chlorophenylphenyldichlorosilane, etc.

Included among the esters that can be employed in the practice of the present invention in combination with $MBH_4$, are for example, esters that boil between about 50° C. to about 250° C., such as for example, ethyl-formate, ethyl-acetate, ethyl-propionate, ethyl-butyrate, n-propyl-formate, n-propyl-acetate, etc., and other esters of monohydric alcohols and monocarboxylic aliphatic acids including isobutyric, valeric, isovaleric, acrylic, etc.; also included are diesters of dicarboxylic acids such as methyloxalate, ethyl adipate, ethyl succinate, dimethyl phthalate, etc.

Nitrile solvents that are operable in the present invention include all aliphatic nitrile solvents boiling within the range of about 50° C. to about 250° C. Typical examples are chloroacetonitrile, acetonitrile, propionitrile, butyronitrile, crotonitrile, benzonitrile, etc.; dinitrile such as succinonitrile, adiponitrile, glutaronitrile, etc. In addition to the aforementioned esters and nitriles which have been specifically named, other esters, polyesters, nitriles and polynitriles are also included in the scope of the present invention as long as they do not react, or form complexes with the reactants that would interfere with the reduction of diorganodihalosilane.

In the practice of the invention, a mixture is formed of alkali borohydride, diorganodihalosilane, with either a nitrile, ester, or mixture thereof. Reaction can be initiated by the employment of external heat. Upon completion of the reaction, the separation of solids can be effected by filtration, flash distillation at a pressure from about 10 mm. to 400 mm. etc. depending upon the physical characteristics of the diorganohalosilane reaction product. The resulting mixture can be fractionated to recover the diorganohalosilane.

In forming the reaction mixture, the order of addition of the respective components is not critical. A proportion of at least 10% by weight of the diorganodihalosilane of the nitrile, ester, or mixture thereof, will provide for effective results. A cosolvent such as a hydrocarbon for example, xylene, toluene, etc. can be utilized to facilitate agitation. In most situations, reaction can be advantageously effected under reflux conditions at atmospheric pressure; a temperature between 0° C. up to the boiling point of the lowest component of the mixture will provide for effective results. Depending upon the conditions employed, therefore, a reaction time of as little as 1 hour or less to several hours or more, for example, 50 or more hours can be required to achieve optimum yields of organochlorosilane.

In order that those skilled in the art will be better able to practice the present invention, the following examples are given by way of illustration and not by way of limitation. All parts are by weight.

*Example 1*

An equimolar mixture of sodium borohydride and diphenyldichlorosilane was prepared by adding a slurry of 7.6 parts of sodium borohydride and 40 parts of acetonitrile, to a solution of 25.3 parts of diphenyldichlorosilane and about 20 parts of acetonitrile. During the addition, exothermic heat was formed. The temperature of the mixture was maintained at 50° C. by external cooling. The reaction mixture was then subjected to flash distillation, and the distillate was fractionally distilled. There was obtained 15% yield of diphenylchlorosilane whose identity was confirmed by its infrared spectrum.

*Example 2*

A mixture having about two moles of sodium borohydride per mole of diphenyldichlorosilane in ethyl acetate was reacted as follows:

There were added 50 parts of diphenyldichlorosilane to a mixture of 9.6 parts of sodium hydride, 1 part of sodium borohydride, and 80 parts of ethyl acetate. The mixture was refluxed for a period of about 8 hours. The mixture was then flash distilled to separate borohydride residue and the resulting distillate was fractionally distilled. There was obtained a 42% yield of diphenylchlorosilane based on diphenyldichlorosilane. The identity of the product was confirmed by its vapor phase chromatograph.

*Example 3*

Diphenylchlorosilane is reduced with an equimolar amount of sodium borohydride in the presence of a dinitrile by the following procedure:

There are added to a mixture of 3.8 parts of sodium borohydride in 50 parts of adiponitrile, 25 parts of diphenyldichlorosilane. The mixture is heated for a period of 12 hours. The liquid product is separated from the solid materials by filtration and flash distilled under reduced pressure. Fractionation of the distillate results in a yield of 15% of diphenylchlorosilane. The identity of the product is confirmed by its infrared spectrum.

*Example 4*

Equal molar amounts of dimethyldichlorosilane and sodium borohydride, in the form of a mixture of sodium hydride, a minor amount of sodium borohydride and ethyl acetate was reacted as follows:

There were added to a reaction vessel, 65 parts of dimethyldichlorosilane, 3 parts of sodium borohydride, 24 parts of a 50% suspension of sodium hydride in mineral oil, and 250 parts of ethyl acetate. The reaction mixture was heated to reflux. A fraction having a boiling range between 36° C. to 70° C. was collected. It was redistilled, and there was obtained a 22% yield of dimethylchlorosilane. The identity of the product was identified by its odor, boiling point of 35.6° C., and its infrared spectrum.

*Example 5*

There was mixed together, 3.8 parts of sodium borohydride, 25.3 parts of diphenyldichlorosilane and 50 parts of ethyl adipate. The mixture was heated to 100° C. for 10 hours. The mixture was filtered and flash distilled. The distillate was fractionated and a 13% yield of diphenylchlorosilane was obtained.

*Example 6*

Equal moles of potassium borohydride and diphenyldichlorosilane in acetonitrile are reacted as follows:

There are added 5.4 parts of potassium borohydride to 25.3 parts of diphenyldichlorosilane in 75 parts of acetonitrile. The reaction mixture is heated to reflux and maintained for a period of 15 hours. Flash distillation under reduced pressure followed by fractionation of the resulting liquid product results in a yield of 14% diphenylchlorosilane, based on the weight of starting diphenyldichlorosilane.

Based on the above results, one skilled in the art would know that the present invention provides a valuable means for converting diorganodihalosilane to the corresponding partially reduced diorganohalosilane. This method can be employed for making diorganohalosilanes shown by Formula 1 in which the organo radicals can be different, such as methylethylchlorosilane, methylphenylchlorosilane, chlorophenylphenylchlorosilane, methylvinylchlorosilane, and also diorganohalosilanes in which the R radicals are the same, such as diphenylchlorosilane, dimethylchlorosilane, diethylchlorosilane, etc.

While the foregoing examples have been limited to only a few of the very many variables within the scope of the present invention, it should be understood that the present invention is directed to the partial reduction of a much broader class of diorganodihalosilane, by use of a wide variety of nitriles, esters, or mixtures thereof, previously described. Diorganhalosilane, shown by Formula 1 can be made by reducing diorganodihalosilane of Formula 2 with sodium borohydride, or potassium borohydride, in the presence of a nitrile, ester, or mixture thereof.

What I claim as new and desire to secure by Letters Patent of the United States is:

1. A method which comprises (1) reacting a diorganodihalosilane having the formula, $$R_2SiX_2$$

with an alkali borohydride having the formula

$$MBH_4$$

in the presence of a member selected from the class consisting of a nitrile, an ester, and a mixture thereof, where there is utilized per mole of said diorganodihalosilane, from about 0.5 to 2 moles of $MBH_4$ reactant selected from (a) $MBH_4$ and (b) a mixture of from about 0.5 to 2 moles of a metal hydride having the formula YH and from about 0.5% to 5% by weight of said diorganodihalosilane of $MBH_4$, (2) effecting the separation of borohydride residue from the product of reaction of (1), and (3) recovering diorganohalosilane from the resulting mixture of (2), where X is a halogen radical, M is a metal selected from sodium and potassium, Y is a metal selected from the class consisting of sodium, potassium, rubidium and cesium, and R is a member selected from the class consisting of monovalent hydrocarbon radicals and halogenated monovalent hydrocarbon radicals.

2. A method in accordance with claim 1, where said diorganohalosilane is reacted in the presence of ethyl acetate.

3. A method in accordance with claim 1, where said diorganhalosilane is reacter in the presence of acetonitrile.

4. A method in accordance with claim 1, where said diorganodihalosilane is a diaryldihalosilane.

5. A method in accordance with claim 1, where said diorganodihalosilane is a dialkyldihalosilane.

6. A method which comprises (1) reacting diphenyldichlorosilane with sodium borohydride in the presence of acetonitrile, where there is utilized per mole of diphenyldichlorosilane from about 0.5 to about 2 moles of a sodium borohydride reactant selected from the class consisting of (a) sodium borohydride, and (b) a mixture of about 0.5 mole to about 2 moles of sodium hydride, and from about 0.5 to 5% of sodium borohydride based on the weight of diphenyldichlorosilane, (2) effecting the separation of borohydride residue from the product of reaction of (1), and (3) recovering diphenylchlorosilane from the resulting mixture of (2).

7. A method which comprises (1) reacting dimethyldichlorosilane with sodium borohydride in the presence of ethyl acetate, where there is utilized per mole of dimethyldichlorosilane, from about 0.5 to 2 moles of a sodium borohydride reactant selected from the class consisting of (a) sodium borohydride, and (b) a mixture of about 0.5 mole to about 2 moles of sodium hydride and from about 0.5 to 5% of sodium borohydride based on the weight of dimethyldichlorosilane, (2) effecting the separation of borohydride residue from the product of reaction of (1), and (3) recovering dimethylchlorosilane from the resulting mixture of (2).

References Cited

UNITED STATES PATENTS

| | | | |
|---|---|---|---|
| 3,014,025 | 12/1961 | Pearson et al. | 260—448.2 |
| 3,099,672 | 7/1963 | Cooper et al. | 260—448.2 |

OTHER REFERENCES

Brown et al.: J.A.C.S., 78, page 2582 (1956).

Hurd, "Chemistry of the Hydrides," pages 30 to 39 and 163, John Wiley and Sons, Inc. (1952).

Klejnot, Inorganic Chem., 2, pages 825 to 828 (1963).

Metal Hydrides Inc., "Sodium-Borohydride-Potassium Borohydride," pages 16 and 17 (1958).

HELEN M. McCARTHY, *Primary Examiner.*

TOBIAS E. LEVOW, *Examiner.*

P. F. SHAVER, *Assistant Examiner.*